United States Patent [19]

Miller

[11] 4,376,334
[45] Mar. 15, 1983

[54] METHOD OF MAKING TERMINAL CLAMP ASSEMBLY

[75] Inventor: Richard G. Miller, Elgin, Ill.

[73] Assignee: Illinois Tool Works Inc., Chicago, Ill.

[21] Appl. No.: 258,115

[22] Filed: Apr. 27, 1981

[51] Int. Cl.³ .................... B23P 11/00; B21K 1/44
[52] U.S. Cl. ........................... 29/437; 29/517;
10/27 R; 10/155 R; 339/246; 411/360;
411/371; 411/533
[58] Field of Search .............. 29/437, 515, 517;
10/27 R, 155 R; 339/246; 411/360, 361, 371,
533, 541

[56] References Cited

U.S. PATENT DOCUMENTS

| | | | |
|---|---|---|---|
| 1,316,877 | 9/1919 | Clarkson | 29/517 UX |
| 1,547,162 | 7/1925 | Bohlman | 411/533 |
| 1,744,199 | 1/1930 | Baker | 29/517 |
| 2,987,811 | 6/1961 | Acres | 29/437 |
| 3,181,584 | 4/1965 | Borowsky | 29/437 X |
| 3,191,140 | 6/1965 | Caldren | 339/246 |
| 3,238,495 | 3/1966 | Lanius, Jr. | 339/246 |
| 3,426,819 | 2/1969 | Estes et al. | 411/360 |
| 3,824,555 | 7/1974 | Klein et al. | 339/246 |
| 4,174,148 | 11/1979 | Obuch et al. | 339/246 |
| 4,310,214 | 1/1982 | Carlson | 339/246 |

FOREIGN PATENT DOCUMENTS 590864  1/1960 Canada .................... 411/360

Primary Examiner—Charlie T. Moon
Attorney, Agent, or Firm—Thomas W. Buckman

[57] ABSTRACT

The invention provides a terminal clamp assembly comprising a fastener and one or more captive members and a method for making such a terminal clamp assembly. The terminal clamp assembly comprises a threaded fastener including a driver head portion, a threaded shank portion of predetermined thread crest diameter and an unthreaded shank portion of lesser diameter intermediate the threaded shank portion and the driver head portion. A captive member has a through aperture of greater diameter than the thread crest diameter and surrounding the unthreaded shank portion, and laterally oppositely outwardly extending protrusions on opposed outer edge portions. These protrusions are compressed by a planar die so as to deform the through aperture to a dimension smaller than the thread crest diameter, thereby captively assembling the captive member with the fastener, subsequent to formation and heat treatment of the fastener.

9 Claims, 19 Drawing Figures

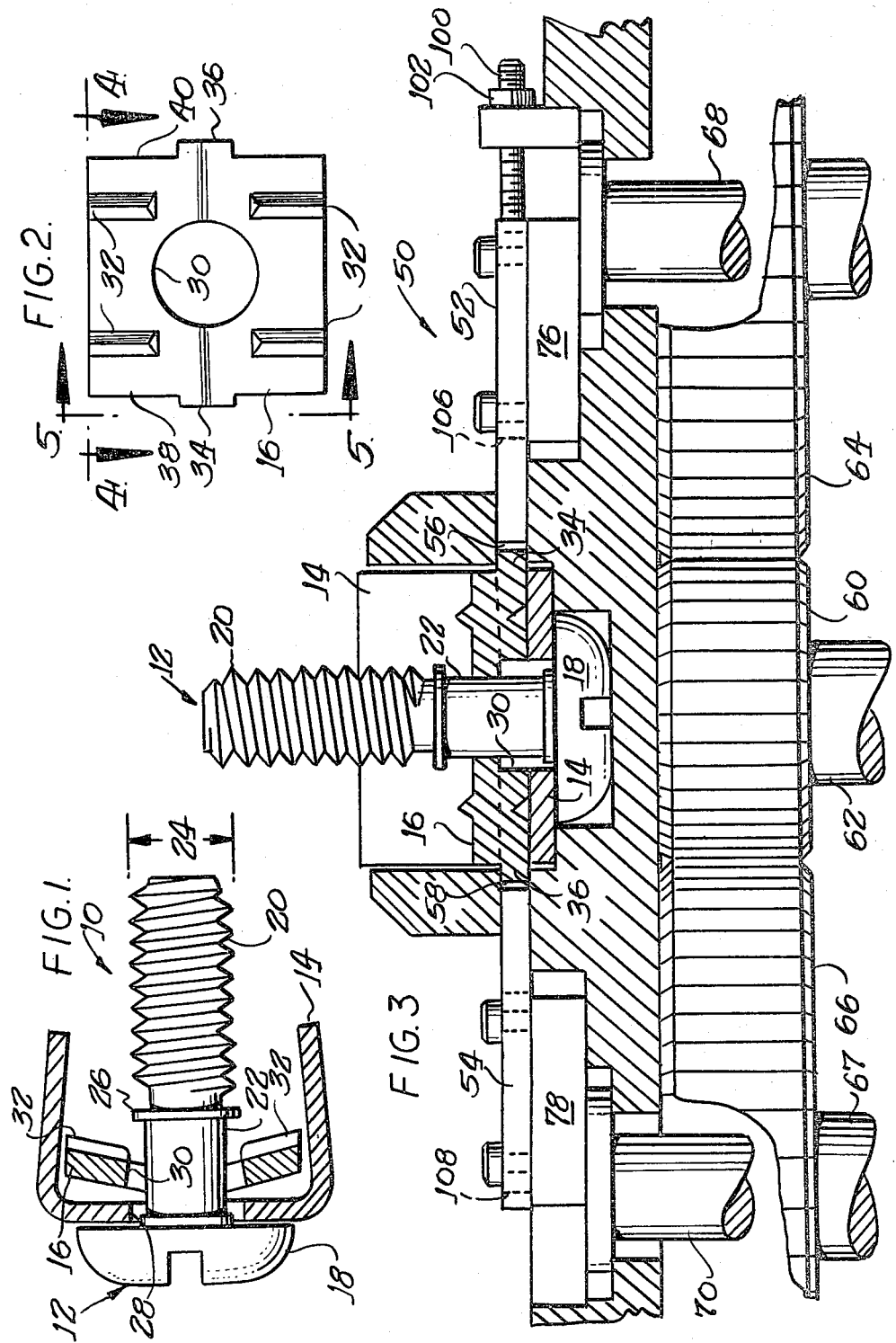

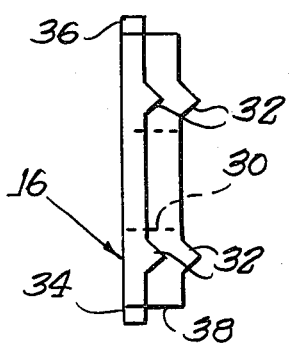
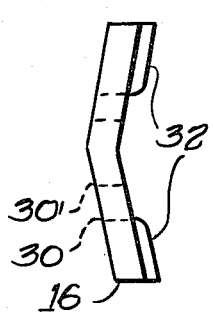
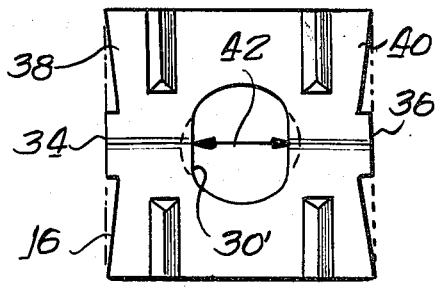
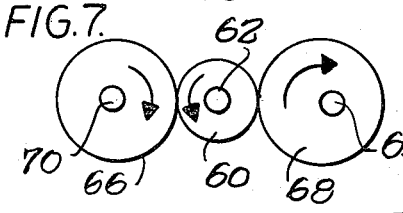
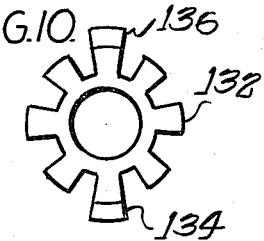
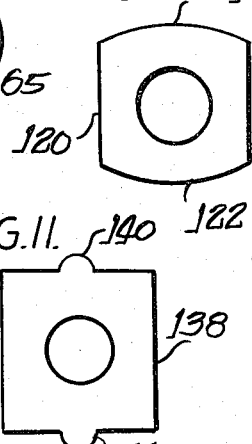
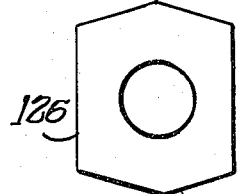
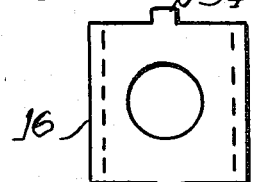
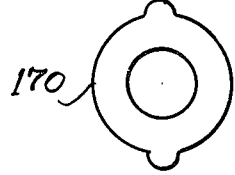
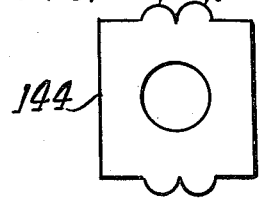
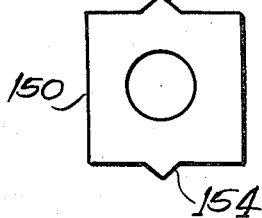
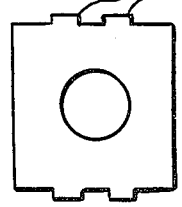
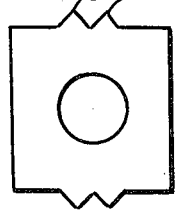
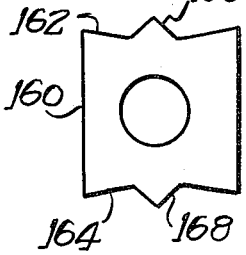

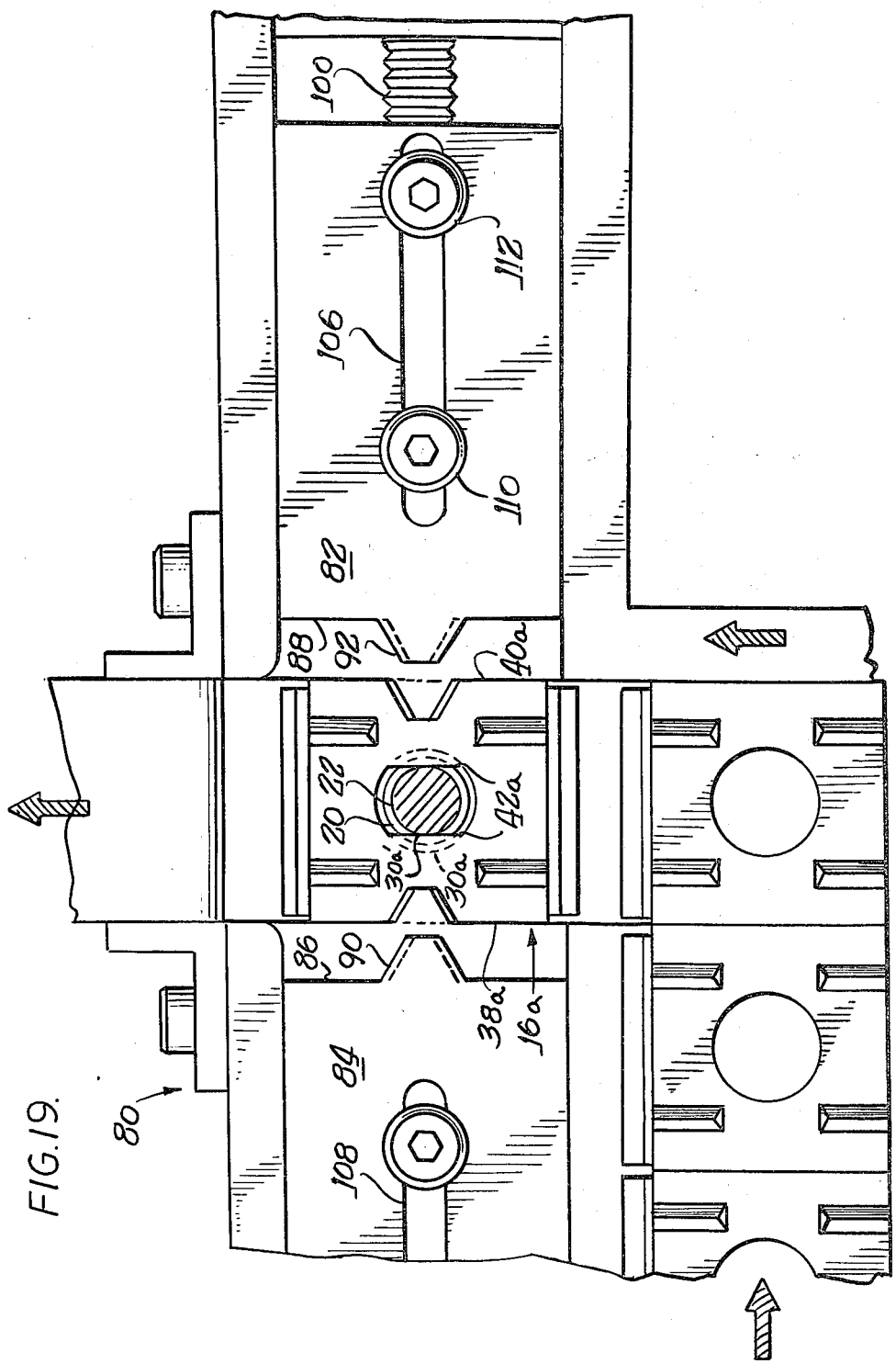

METHOD OF MAKING TERMINAL CLAMP ASSEMBLY

BACKGROUND OF THE INVENTION

The present invention is directed generally to fasteners carrying captive members and more particularly to a terminal clamp assembly comprising a fastener and one or more captive members and a method for making such a terminal clamp assembly.

While the present invention is applicable to fasteners which carry captive members in general, the disclosure will be facilitated by specific reference to a terminal clamp assembly. Typically, such terminal clamp assemblies are utilized for removably securing the end or ends of one or more conductors to a work piece, such as a terminal block, bus bar, circuit breaker or the like.

Conventionally such terminal block assemblies include one or more surfaces which may be specially formed or otherwise adapted to receive at least one conductor element connected thereto by a terminal clamp. A suitable threaded aperture is generally provided in the conductor receiving surface for receiving a complementarily threaded shank portion of a terminal clamp fastener.

Accordingly, such terminal clamp fasteners conventionally include a fastener comprising a head portion and threaded shank portion and at least one clamping member carried on the fastener. Preferably, the clamping member is captively assembled with the fastener. To this end, such fasteners generally include an unthreaded shank portion of lesser diameter than the thread, intermediate the drive head and threaded shank portion for captively holding the clamping member, to provide a unitary terminal clamp fastener assembly. The problem, then, is in assembling these parts in this fashion.

Since such terminal clamp fastener assemblies must generally be provided in large quantities, it is important to minimize the cost of production and assembly thereof. In this regard, various economies have been introduced in the formation of threaded fasteners. However, there is room for yet further improvement.

The prior art has proposed a number of solutions to the problem of economically providing a pre-assembled fastener with captive clamping member. For example, the conventional Sems technique is disclosed in U.S. Pat. No. 3,191,140. In this regard the word "Sems" has been generally utilized in the art to refer to such fastener and captive member assemblies. In the aforementioned U.S. Pat., one or more captive clamping pieces or the like are preassembled to a fastener to screw blank, whereupon the thread is rolled or otherwise formed thereupon. However, the captive member must then undergo the same heat treatment as the fastener or screw, which has the disadvantage of depriving the captive member of its desired resiliency.

Lanius U.S. Pat. No. 3,238,495 proposed to avoid these problems by individually heat treating the already formed screw or fastener and other captive parts as desired, prior to assembly thereof. Accordingly, Lanius proposes first forming and heat treating a threaded screw or fastener, including a drive head, a thread portion of given crest diameter and an unthreaded shank portion intermediate the drive head and threaded shank portion and of lesser diameter than the thread crest diameter. Hence, the captive members to be assembled with this fastener include a through aperture of diameter at least as great as the thread crest diameter to interfit thereover for engagement with the drive head and generally surrounding the unthreaded shank portion. Accordingly, Lanius proposes staking at least the captive member farthest removed from the drive head to accomplish captive assembly thereof, and of any further captive members thereunder, with the fastener. In this regard, Lanius proposes staking by the expedient of pushing or deforming a portion of the lower surface of this captive member toward the unthreaded shank portion. However, the success of this technique in producing a reliable captive assembly depended upon the characteristics of the staked material (i.e. hardness, brittleness, resiliency, etc.), and upon the amount of material moved during the deformation or staking process. Moreover, such terminal clamp assemblies generally include a U-shaped bracket member, within which a second, wire clamping member is positioned. Accordingly, reliably staking the clamping member from the bottom within the confines of the U-shaped clamp member has proven difficult.

OBJECTS AND SUMMARY OF THE INVENTION

Accordingly, it is a general object of the invention to provide a novel and improved fastener and captive member assembly and a method for making such an assembly.

A more specific object is to provide an improved terminal clamp assembly and method of making such a terminal clamp assembly which avoids the problems of the prior art.

A further object is to provide an assembly of the foregoing type which is simpler and less expensive to assemble than prior art assemblies of this type, and yet is highly reliable in operation.

A related object is to provide a method of forming such an assembly which is simpler and less expensive than prior art methods and yet reliably provides an acceptable assembly.

In accordance with the invention, an improved method of constructing a threaded fastener with at least one captive member, comprises the steps of providing a fastener blank including a drive head portion and a shank portion, forming said shank portion to define a thread of predetermined crest diameter and an unthreaded shank of diameter less than said thread crest diameter intermediate said thread and said drive head, heat-treating said formed fastener, and thereafter providing at least one member to be held captive on said fastener and having a through aperture of greater diameter than said thread crest diameter, inserting said fastener through said through aperture until said through aperture surrounds said unthreaded shank, and thereafter compressing predetermined portions of substantially opposed outer edges of said captive member until said through aperture deforms in at least one dimension thereof to a dimension smaller than said thread crest diameter, thereby captively assembling said captive member with said fastener.

In accordance with another aspect of the invention, an improved fastener and captive member assembly comprises a threaded fastener including a drive head portion, a threaded shank portion of predetermined thread crest diameter, an unthreaded shank portion of lesser diameter than said thread crest diameter and intermediate said threaded shank portion and said drive head portion, a captive member having a through aperture of greater diameter than said thread crest diameter and surrounding said unthreaded shank portion, and laterally oppositely outwardly extending protrusions on opposed outer edge portions compressible by die means for deforming said through aperture in at least one dimension smaller than said thread crest diameter, thereby captively assembling said captive member with said fastener subsequent to forming and heat treatment of said fastener.

BRIEF DESCRIPTION OF THE DRAWINGS

The foregoing as well as other objects, features and advantages of the invention will be more readily appreciated upon reading the following detailed description of the illustrated embodiments, together with reference to the accompnying drawings, wherein:

FIG. 1 is a plan view, partially in section, of an assembled terminal clamp assembly in accordance with the present invention;

FIG. 2 is a top plan view of a clamping plate member of the terminal clamp assembly of FIG. 1;

FIG. 3 is a side elevation, partially in section, of an assembling machine, illustrating a method of assembly of the terminal clamp assembly of FIG. 1 in accordance with the principles of the invention;

FIG. 4 is a view taken generally along the line 4—4 of FIG. 2;

FIG. 5 is a view taken generally along the line 5—5 of FIG. 2;

FIG. 6 is a top plan view, similar to FIG. 2 illustrating the action of the machine of FIG. 3 upon the clamping plate of FIG. 2;

FIG. 7 illustrates a portion of the machine of FIG. 3 in reduced size;

FIGS. 8 through 18 illustrate alternate embodiments of the clamping plate of FIG. 2; and FIG. 19 illustrates a modified assembly machine and modified clamping plate for practising an alternate form of the method of the invention.

DETAILED DESCRIPTION OF THE ILLUSTRATED EMBODIMENT

Referring now to the drawings and initially to FIG. 1, a terminal clamp assembly constructed in accordance with the invention is designated generally by the reference number 10. Conventionally, this terminal clamp assembly includes a fastener or a screw member designated by the reference numeral 12, a generally U-shaped clip or bracket member 14 and a concave-convex clamping plate member 16. In accordance with conventional practice, the U-shaped clip 14 and clamping plate 16 are captively assembled with the screw fastener 12.

Further in accordance with conventional practice the screw fastener 12 includes a drive head 18 which may be in any one of a number of conventional forms, but is here illustrated as a slotted head. The shank of the screw is divided into a threaded shank portion 20 and an unthreaded shank portion 22 intermediate the head 18 and the threaded shank portion 20. Also in accordance with conventional practice, the screw fastener 12 may be formed from a blank including a head 18 and unthreaded shank by a relatively inexpensive process such as cold rolling, whereby a predetermined portion of the shank is outwardly deformed to form the thread 20, while the remaining shank portion 22 remains unthreaded. Accordingly, the crest diameter 24 of the threaded shank portion 20 is greater than the diameter of the unthreaded shank portion 22. A suitable intermediate shoulder portion 26 of similar diameter to the thread crest diameter 24 may also be formed during this process. The thus-formed threaded fastener 12 is then heat-treated by a suitable, and conventional heat treatment process.

Departing from convention, the captive U-shaped clip 14 and clamping plate 16 are not assembled with the fastener 12 until after its formation and the heat treating process has been completed. Advantageously, then, the clip 14 and clamp 16 are not subjected to the same heat treatment as the screw or fastener 12, and therefore may be separately formed and treated so as to retain a desired degree of resiliency. This resiliency facilitates the clamping of one or more conductors to a terminal block or like assembly, as is well known in the art.

In order to assemble the foregoing parts in accordance with the invention, the clip 14 and clamp 16 are provided with substantially centrally located through apertures 28, 30 respectively, which are of greater diameter than the thread crest diameter 24. Accordingly, the screw or fastener 12 is first inserted through the clip member 14 and then the clamp member 16 so as to position the unthreaded shank portion 22 within the through apertures 28, 30 thereof, as illustrated in FIG. 1. It will be noted that this results in the clamp member being partially surrounded by the downwardly extending legs or sidewalls of the clip 14.

Referring now to FIG. 2, the clamping plate 16 will be seen to conventionally include a plurality of generally V-shaped conductor-engaging protrusions 32. In the illustrated embodiment these protrusions 32 are four in number and substantially symmetrically located with respect to the central aperture 30. Further in accordance with conventional practice these V-shaped protrusions comprise embossments which are stamped or otherwise suitably formed by embossing material from the convex side of the clamping plate 16 toward the concave side thereof, as best viewed in FIG. 4, to which reference is also invited.

In accordance with one embodiment of the invention, a pair of laterally outwardly, and oppositely protruding surfaces or ears 34, 36 are formed at laterally opposed side edges 38, 40 of the clamping plate 16. In the illustrated embodiment, these protrusions 34, 36 are substantially symmetrically located about a center line or diameter through the central aperture 30 of the plate 16. Moreover, the plate 16 is aligned with respect to the U-shaped clip 14 so that these ears or protrusions 34, 36 are accessible through the open sides of the U-shaped clip 14.

In accordance with an important feature of the invention, these ears 34, 36 may be inwardly depressed or compressed by suitable means, such as a die, to thereby partially collapse the central aperture 30 of the plate 16, for example, as shown in FIG. 5 and FIG. 6.

Specifically, the lateral extent of the protrusions 34, 36 with respect to the side edges 38, 40 of the plate 16 determines the extent of compression of these side wall 30, 40, for example due to compression by a pair of planar die faces. In this regard, engagement of such planar die faces with the corners at either end of the respective edges 38, 40 can be utilized to define the maximum extent of compression of the laterally projecting ears 34, 36, as indicated in dashed line in FIG. 6. Consequently, the central aperture 30 will be deformed inwardly to define a new lateral dimension 42 thereof, hence defining an inwardly deformed or decreased or compressed portion 30' of the aperture 30 across dimension 42. In accordance with the invention, this decreased dimension 42 is smaller than the diameter of the thread crest 24, whereby the clamping plate 16 and hence the U-shaped clip member 14 are now held captively engaged on the unthreaded shank portion 22 of the fastener 12.

Referring now to FIG. 3, a portion of a machine 50 for captively assembling a captive member to a fastener in accordance with the method of the invention, and more importantly, for compressing or deforming the plate 16, is shown. This machine 50 includes a pair of suitable die members, blades or plates 52, 54 which terminate in inwardly facing planar die faces 56, 58. A suitable drive structure is provided for urging the dies 52, 54 inwardly for compression of the ears 34, 36 by the planar die faces 56, 58. As also shown in FIG. 7, this drive structure includes a drive wheel 60 rotated by a drive shaft 62 and a pair of driven wheels 64, 66 in frictional engagement or otherwise engaged to be driven by the drive wheel 60. These driven wheels 64, 66 are mounted on shafts 65, 67 and eccentrically mount for rotation shafts 68, 70. These eccentrically rotated shafts 68, 70 are mounted for reciprocating respective plates 76, 78 mounting the dies 52, 54. The particular structures utilized for reciprocating the dies 52, 54 form no part of the invention and will not be described in detail. Moreover, the drive structure just described is for purposes of illustration only. Alternative structures may be employed without departing from the invention.

Reference is next invited to FIG. 19 wherein a machine 80 substantially is similar to the machine 50 illustrated in conjunction with a second embodiment of the method of the invention. In this embodiment, dies 82, 84 are mounted to be reciprocated by a suitable drive structure which may be substantially identical to that described above with reference to FIG. 3. However, these dies 82, 84 include die faces 86, 88 which are punctuated by inwardly protruding die surfaces 90, 92, which, in the illustrated embodiment, are substantially centered thereupon. Accordingly, a clamping plate 16a is provided with a through aperture 30a and relatively flat sides edges 38a, 40a which are inwardly compressed by the action of the protruding die surfaces 90 92. Consequently, a similar degree of deformation or inward compression is imparted to the through aperture 30a. The extent of the protrusion of the die surfaces 90, 92, together with the extent of inward movement of the dies 82, 84 determines the extent of this deformation or compression of the plate 16a and hence of the aperture 30a. It will be understood that any configuration of protruding die surfaces 90, 92 may be employed which will achieve the desired deformation of the aperture 30a, without departing from the invention.

In FIG. 19, the clamping plate 16a located between the dies 82 and 84 is shown in its already compressed or deformed condition. In this regard it will be appreciated that the extent of deformation of the through aperture 30a is such as to provide at least one dimension 42a thereof which is of lesser dimension than the thread crest diameter 24 of the screw fastener 12.

In one practical embodiment of the machines of FIGS. 3 and 19, the extent of inward movement of the respective dies 52, 54 and 82, 84 may be further preset or controlled to accommodate different sizes of captive members such as the clamping plates 16, 16a. To this end, in the illustrated embodiments an adjustable set screw 100 is laterally movable by means such as a nut 102 (See FIG. 3), so that its inner end engages the outer side surface of each die or blade 52, 54 or 82, 84. Cooperatively, the dies or blades 52, 54 or 82, 84 are provided with elongate mounting slots 106, 108, as best viewed in FIG. 19, and a pair of spaced apart mounting screws 110, 112. These screws 110, 112 are spaced apart by an amount less than the length of the elongate slot 106 and extend therethrough to couple the respective dies or blades 52, 54 or 82, 84 with their mounting plates 76, 78 (See FIG. 3). Hence, the adjustment of the set screw 100 and positioning of the elongate slots 106, 108 while mounting the dies or blades 52, 54 or 82 84 determines the extent of inward travel thereof in compressing the clamping plate or other captive member.

While illustrated and described above with respect to a captive assembly including a clamping plate as illustrated in FIG. 2, the principles illustrated herein may be applied to other captive members. Referring briefly to FIGS. 8 through 18, inclusive, exemplary forms of other such captive members are illustrated in simplified top plan views. In each of the embodiments of FIGS. 8 through 18, inclusive, the captive members include suitably laterally oppositely outwardly protruding parts for engagement and compression by suitable dies such as the dies 52, 54 shown in FIG. 3. These protruding edge portions of each of the captive members of FIGS. 8 through 18 may be suitably sized and located to result in the desired amount of compression or inward deformation of the through apertures thereof to effect captive assembly with a given fastener such as the screw 12 of FIG. 1.

Briefly, the captive member 120 of FIG. 8 includes a pair of convex or outwardly bowed side edge surfaces 122, 124 for this purpose. Alternatively, a captive member 126 of FIG. 9 is provided with laterally outwardly extending, converging edge surfaces 128, 130 which diverge to respectively outwardly protruding points from the respective opposed edge corners of the otherwise rectangular captive member 126.

In FIG. 10, a captive member 132 takes the form of a conventional toothed washer, provided with a pair of outwardly extending protrusions, ears or tabs 134, 136 on one pair of radially opposite teeth thereof.

In FIG. 11, a generally rectangular captive member 138 includes rounded outwardly oppositely extending tabs 140, 142, substantially similar to the generally rectangularly configured tabs 34, 36 of the clamping plate 16 of FIG. 2. In FIG. 13, an annular, washer-like captive member 170 is provided with oppositely protruding rounded parts 172.

FIG. 12, repeats a simplified top plan view of the clamping plate 16 of FIG. 2 for ready comparison with the other alternative configurations of FIGS. 8 through 18. In this regard, each of the members of FIGS. 8 through 18 which are generally rectangular in top plan view therein may comprise a similar clamping plate 16, but provided with different configuration of outwardly protruding ears or pieces to effect compression thereof in accordance with the invention.

In this latter regard, FIG. 14 illustrates such a clamping plate 144 wherein a pair of adjacent, semicircular protrusions 146, 148 are provided at opposing side edges. In FIG. 15, an otherwise similar clamping plate 150 includes substantially centrally located outwardly protruding triangular protrusions of points 152, 154 at opposing side edges thereof. In FIG. 16 and FIG. 17 pairs of spaced apart, respectively rectangularly and triangularly or pointedly-configured protrusions or tabs 156, 158 are respectively provided at opposing side edges of the clamping plate.

Finally, in FIG. 18 a clamping plate 160 has a pair of opposed side edges 162, 164 which are generally concave, but which includes substantially centered thereon outwardly projecting triangular or pointed projections 166, 168 which extend beyond the plane defined by the outermost edges of the respective concave edges or surfaces 162, 164.

Accordingly, it will be seen that various alternatives, changes and modifications may be effected without departing from the invention. The present invention is intended to include such changes, alternatives and modifications insofar as they fall within the spirit and scope of the appended claims.

The invention is claimed as follows:

1. In a method of constructing a terminal clamp including the steps of providing a threaded fastener having a thread of predetermined crest diameter, a drive head and a shank portion intermediate said thread and said drive head and of lesser diameter than said thread crest diameter, providing a centrally apertured U-shaped clip, the central aperture thereof being of greater diameter than said thread crest diameter, inserting said fastener through said clip aperture until said clip aperture surrounds said shank portion, providing a centrally apertured clamping plate receivable within said U-shaped clip, the central aperture of said clamping plate being of greater diameter than said thread crest diameter, inserting said fastener through said clamping plate aperture until said clamping plate aperture surrounds said shank portion so as to position said clamping plate intermediate said U-shaped clip and said thread, the improvement comprising: the additional step of compressing a predetermined portion of substantially opposed outer edges of said clamping plate in a lateral plane substantially normal to said fastener shank until said clamping plate aperture deforms in at least one dimension thereof to a lateral dimension smaller than said thread diameter, thereby captively assembling said clamping plate and said U-shaped clip with said fastener shank.

2. The improvement according to claim 1 wherein the step of compressing further includes providing a planar die including a jig portion and a pair of inwardly facing die surfaces, positioning said fastener with said U-shaped clip and said clamping plate assembled with said fastener shank in said jig portion with said predetermined portion of said clamping plate opposed outer edges exposed to said facing die surfaces and urging said facing die surfaces inwardly to compress said predetermined portion of said clamping plate opposed outer edges.

3. The improvement according to claim 2 wherein the steps of providing said die includes providing inwardly extending protrusions on said facing die surfaces for compressing portions of said opposed outer edges of said clamping plate in alignment with said die surface protrusions.

4. The improvement according to claim 2 wherein the step of providing said die includes providing substantially flat facing die surfaces and wherein the step of providing said clamping plate further includes providing laterally oppositely outwardly extending protrusions on said clamping plate opposed outer edges comprising said predetermined portions thereof for compression by said flat die surfaces.

5. A method of constructing a threaded fastener with at least one captive member, comprising: providing a fastener blank including a drive head portion and a shank portion, forming said shank portion to define a thread of predetermined crest diameter and an unthreaded shank of diameter less than said thread crest diameter intermediate said thread and said drive head, heat-treating said formed fastener, and thereafter providing at least one member to be held captive on said fastener and having a through aperture of greater diamter than said thread crest diameter, inserting said fastener through said through aperture until said through aperture surrounds said unthreaded shank, and thereafter compressing predetermined portions of substantially opposed outer edges of said captive member until said through aperture deforms in at least one dimension thereof to a dimension smaller than said thread crest diameter, thereby captively assembling said captive member with said fastener.

6. A method according to claim 5 wherein the step of compressing further includes providing a substantially planar die including a pair of inwardly facing die surfaces, positioning said at least one member to be held captive with said fastener inserted therethrough with said opposed outer edges of said captive member exposed to said facing die surfaces, and thereafter urging said facing die surfaces inwardly to compress said predetermined portions of said captive member opposed outer edges.

7. A method according to claim 6 wherein the step of providing said die further includes providing inwardly extending protrusions on said facing die surfaces for compressing portions of said captive member opposed outer edges in alignment with said die surface protrusions.

8. A method according to claim 6 wherein the step of providing said die includes providing substantially flat facing die surfaces and wherein the step of providing said captive member further includes providing laterally oppositely outwardly extending protrusions on said opposed outer edges thereof comprising said predetermined portions for compression by said die surfaces.

9. In a method of constructing a threaded fastener with at least one captive member, comprising the steps of providing a fastener blank including a drive head portion and a shank portion, forming said shank portion to define a thread of predetermined crest diameter and an unthreaded shank of diameter less than said thread crest diameter intermediate said thread and said drive head, heat-treating said formed fastener, and thereafter providing at least one one member to be held captive on said fastener and having a through aperture of greater diameter than said thread crest diameter, inserting said fastener through said through aperture until said through aperture surrounds said unthreaded shank, the improvement comprising the further step of thereafter compressing predetermined portions of substantially opposed outer edges of said captive member until said through aperture deforms in at least one dimension thereof to a dimension smaller than said thread crest diameter, thereby captively assembling said captive member with said fastener.

* * * * *